US009260980B2

(12) United States Patent
Leese

(10) Patent No.: US 9,260,980 B2
(45) Date of Patent: Feb. 16, 2016

(54) ROTATING FLUID PUMPING SYSTEM

(75) Inventor: Robert E. Leese, Derby (GB)

(73) Assignee: ROLLS-ROYCE plc, London (GB)

( * ) Notice: Subject to any disclaimer, the term of this patent is extended or adjusted under 35 U.S.C. 154(b) by 1021 days.

(21) Appl. No.: 13/365,605

(22) Filed: Feb. 3, 2012

(65) Prior Publication Data
US 2012/0233977 A1 Sep. 20, 2012

(30) Foreign Application Priority Data

Mar. 17, 2011 (GB) .................................. 1104463.3

(51) Int. Cl.
F01D 25/20 (2006.01)
F01D 25/18 (2006.01)
F02C 7/14 (2006.01)
F02C 7/32 (2006.01)
F02C 3/067 (2006.01)

(52) U.S. Cl.
CPC ................ *F01D 25/20* (2013.01); *F01D 25/18* (2013.01); *F02C 7/14* (2013.01); *F02C 7/32* (2013.01); *F02C 3/067* (2013.01); *Y02T 50/675* (2013.01)

(58) Field of Classification Search
CPC ............ F02C 3/107; F02C 3/113; F02C 7/36; F02C 7/32; F02C 7/14; F05D 2260/98; F01D 25/18; F01D 25/183; F01D 25/20
See application file for complete search history.

(56) References Cited

U.S. PATENT DOCUMENTS

| 2,594,642 | A | * | 4/1952 | Gross et al. ................... 415/123 |
| 3,834,157 | A | * | 9/1974 | Hoffmann .................. 60/39.093 |
| 4,062,185 | A | | 12/1977 | Snow |
| 4,541,785 | A | | 9/1985 | Höarler |
| 4,887,424 | A | * | 12/1989 | Geidel et al. ................. 60/39.08 |
| 2003/0077173 | A1 | | 4/2003 | Franchet et al. |
| 2008/0093174 | A1 | * | 4/2008 | Suciu et al. .................. 184/6.11 |
| 2008/0098718 | A1 | * | 5/2008 | Henry et al. ................. 60/226.1 |

FOREIGN PATENT DOCUMENTS

| DE | 39 05 282 C1 | 5/1990 | |
| EP | 2 322 766 A2 | 5/2011 | |
| EP | 2 338 703 A2 | 6/2011 | |
| GB | 937826 | * 9/1963 | ............... F02C 7/14 |
| GB | 1 451 067 | 9/1976 | |
| WO | WO 97/17256 A1 | 5/1997 | |

OTHER PUBLICATIONS

Jul. 28, 2011 Search Report issued in British Patent Application No. GB1104463.3.

* cited by examiner

Primary Examiner — Andrew Nguyen
(74) Attorney, Agent, or Firm — Oliff PLC

(57) ABSTRACT

A mechanism such as a rotor of an open rotor gas turbine engine comprises a rotor assembly 100 rotatable about a rotational axis A. The rotor assembly 100 has a fluid pathway 110 including a pump 114 carried by the first rotor assembly 100 for driving fluid along the fluid pathway 110. The fluid may be oil for lubricating components of the mechanism. The fluid is collected by an annular channel-shaped collector 111 and pumped through surface coolers 116 to an outlet pipe 119. From the pipe 119 the fluid migrates along a path 500 under centrifugal force, returning to the collector 111.

15 Claims, 2 Drawing Sheets

ROTATING FLUID PUMPING SYSTEM

Figure 1:
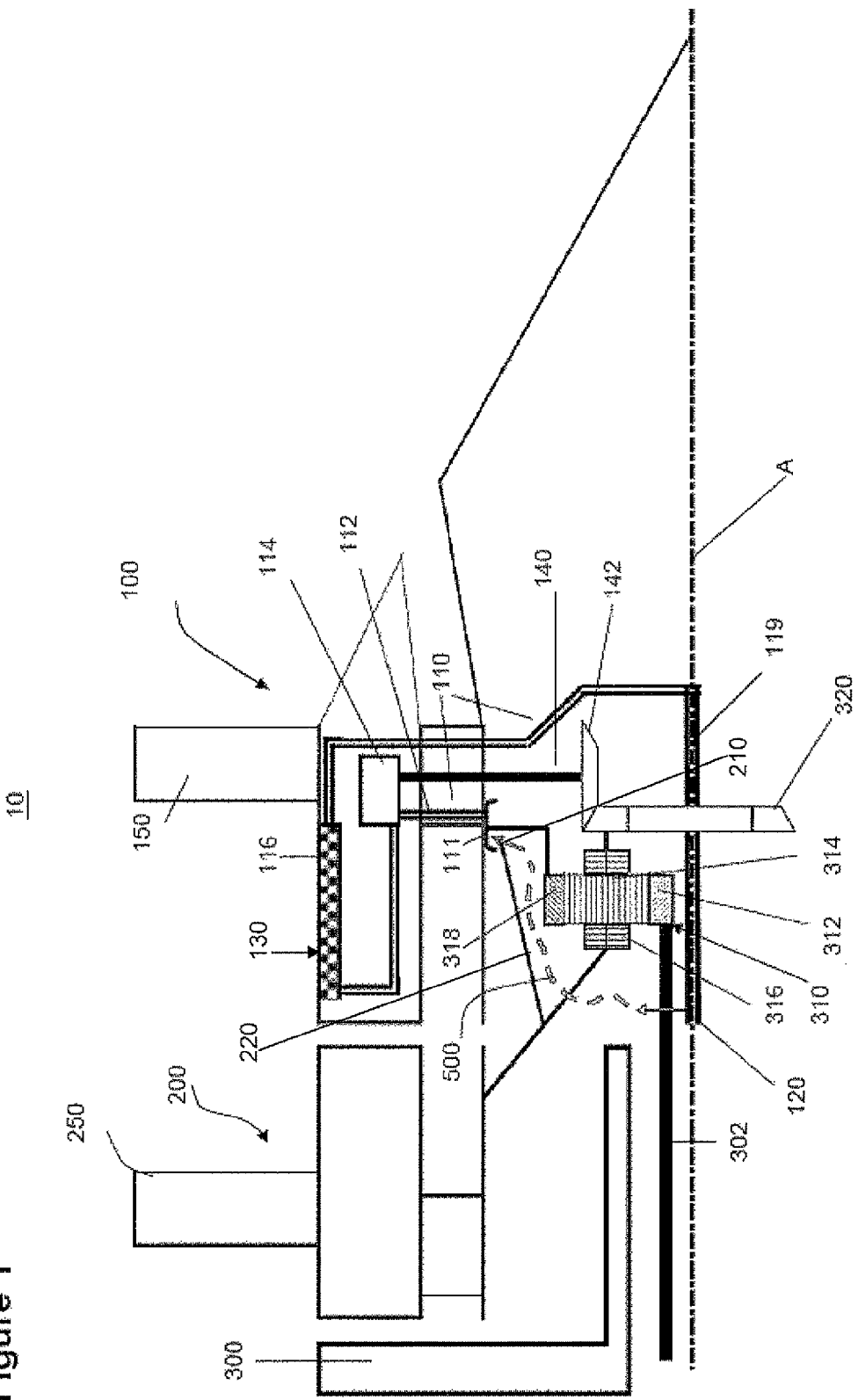

This invention relates to a fluid pumping system within a rotating assembly, and is particularly, although not exclusively, concerned with an oil pumping system within an open rotor gas turbine engine with contra-rotating rotors.

Gas turbine engines require an oil system to lubricate components such as gear systems and bearings.

In a conventional gas turbine engine the oil pumping system is mounted on static (i.e. non-rotating) parts of the engine and is subject to gravity forces only. The oil is scavenged from the bearing chambers and gearbox directly. The oil cooling system is also static.

An open rotor gas turbine engine comprises a core engine which drives one or more open rotors through a gear mechanism. The gear mechanism provides a speed reduction and, where the core engine drives contra-rotating rotors, provides drive to the rotors in opposite directions. The or each rotor may be in the form of a propeller, and may be at the front or rear of the core engine. The core engine is typically enclosed in a nacelle, with the rotor or rotors situated outside the nacelle and cantilevered from the core engine.

Unlike a conventional gas turbine engine with contra-rotating rotors, a rear-mounted open rotor thrust system has no static structure aft of the gear system driving the rotor assembly or assemblies.

An oil pumping system mounted in the static structure of the engine presents a number of problems for the scavenge, cooling and supply of oil to bearings and gears of an open rotor gas turbine engine.

On a non-rotating component, oil will flow downwards under gravity, and so can be easily collected. On a rotating component, oil is driven along a radially outward path by centrifugal force. Therefore it is difficult to scavenge the oil away from the rear rotor assembly to a remote cooling and pumping system on the static part.

Furthermore, a statically mounted oil pumping system requires oil jets mounted on the static structure to direct lubricating and cooling oil toward the gearbox and support bearings of a rear-mounted rotor assembly. A means of directly supplying the oil to these components is more desirable.

Furthermore, a statically mounted oil cooling system that uses surface mounted heat exchangers, or surface coolers, to transfer heat from the oil to the air can provide inadequate cooling when the aircraft is stationary and the engine is running, for example in the ground idle condition. Under these conditions, there is a very low or zero air velocity adjacent to the surface cooler. Consequently the rate of heat transfer is low and the oil cooling system may not be able to reject sufficient heat to the surrounding air via the surface cooler.

According to a first aspect of the invention, there is provided a mechanism comprising a first rotor assembly rotatable about an axis, the first rotor assembly having a fluid pathway including a pump carried by the first rotor assembly for driving fluid along the fluid pathway.

The fluid pathway may comprise a fluid collector in communication with an inlet of the pump. The fluid collector may be situated away from the rotational axis of the first rotor assembly, and may be situated radially inwardly of the pump.

The fluid collector may be an annular radially inwardly opening channel centred on the rotational axis.

There may be a flow restrictor between the fluid collector and the pump. The flow restrictor may be arranged to allow fluid to build up radially inwardly of the flow restrictor under centrifugal force when the first rotor assembly is rotating such that the collector acts as a de-aerator and therefore only de-aerated fluid enters the fluid pump.

The pump may have an outlet which communicates via a portion of the fluid pathway to a region of the mechanism situated radially inwardly of the collector.

The fluid pathway may comprise at least one surface cooler which is exposed at an external surface of the first rotor assembly.

The surface cooler may be one of at least two surface coolers which are distributed about the rotational axis, the pump being disposed circumferentially between the surface coolers or between two adjacent surface coolers.

Components of the fluid pathway may be distributed about the rotational axis of the first rotor assembly to balance the first rotor assembly during rotation.

The fluid pathway may further comprise a fluid filter. The fluid filter may be located substantially diametrically opposite the fluid pump to balance the first rotor assembly during rotation.

The mechanism may further comprise a drive shaft mounted in the first rotor assembly for driving the pump, the drive shaft extending radially with respect to the rotational axis of the first rotor assembly. The drive shaft may be driven by relative rotation between the first rotor assembly and another component of the mechanism.

The mechanism may further comprise a second rotor assembly which is rotatable about the rotational axis. The drive shaft may be driven by the relative rotation between the first rotor assembly and the second rotor assembly.

The first and second rotor assemblies may be drivable by a transmission mechanism which is adapted to rotate the first and second rotor assemblies in opposite directions.

The transmission mechanism may be an epicyclic gear mechanism, through which the input shaft drives the first and second rotor assemblies. For example, the first rotor assembly may be mounted for rotation with an annulus gear of the epicyclic gear mechanism and the second rotor assembly may be mounted for rotation with a planet carrier of the epicyclic gear mechanism.

The drive shaft for driving the pump may be drivingly connected to the planet carrier by a bevel gear arrangement. The bevel gear arrangement may have a non unity gear ratio to increase or decrease the rotational speed of the drive shaft about the radial axis with respect to the relative rotational speed of the first and second rotor assemblies.

The mechanism may further comprise a series of waterfalls arranged in both the first rotor assembly and the second rotor assembly, the waterfalls being arranged such that, when the rotor assemblies are rotating, the fluid flows on a radially outward path through the rotor assemblies under the centrifugal force acting on the fluid. The mechanism may further comprise a contra-rotational weir mounted on one of the first and second rotor assemblies, the contra-rotational weir being arranged such that, when the rotor assemblies are rotating, the fluid flows on a radially outward path between one contra-rotating assembly and the other.

The fluid may be oil.

According to a second aspect of the invention, there is provided a gas turbine engine having contra-rotatable rotors and a mechanism in accordance with the first aspect of the invention.

The contra-rotatable rotors may be rear-mounted open rotors.

The invention also provides an aircraft having a gas turbine engine in accordance with the second aspect of the invention.

Figure 2:
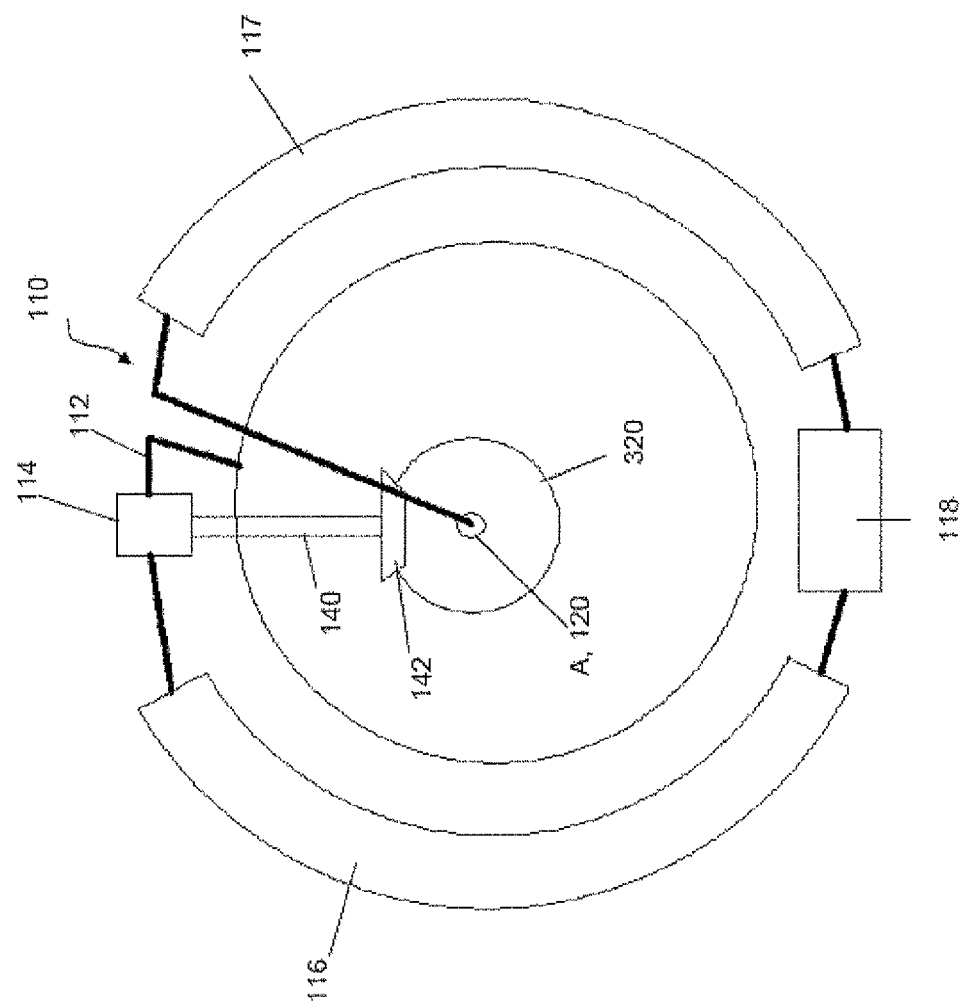

Embodiments of the present invention will now be described, by way of example, with reference to the accompanying drawings, in which:

FIG. 1 shows in schematic half cross-section a rear-mounted open rotor thrust system; and FIG. 2 shows in radial cross section components of a fluid pathway in the system of FIG. 1.

With reference to FIG. 1, an open rotor thrust system 10 comprises a first rotor assembly 100 and a second rotor assembly 200 and is rear-mounted to a static part 300 of a gas turbine engine. The gas turbine engine is mounted on an aircraft (not shown).

An input shaft 302 rotatable about an axis A of the engine is connected to an epicyclic gear mechanism 310. The epicyclic gear mechanism 310 comprises a central sun gear 312 driven by the input shaft 302 and rotatable about the rotational axis A; a planet carrier 316 rotatable about the rotational axis A; a plurality of planet gears 314 mounted for rotation on the planet carrier 316 and meshing with the sun gear 312; and an annulus gear 318 forming an outer ring meshing with the planet gears 314 and rotatable about the rotational axis A. The planet carrier 316 rotates in the opposite direction to the annulus gear 318.

The planet gears 314 are rotatable about their own axes respectively and revolve around the central sun gear 312.

The sun 312, planet 314 and annulus 318 gears lie in a plane normal to the input shaft 302 and rotational axis A.

The first rotor assembly 100 is mounted to rotate with the annulus gear 318. The first rotor assembly carries a set of externally mounted propeller blades 150.

The second rotor assembly 200 is mounted to rotate with the planet carrier 316. The second rotor assembly carries a set of externally mounted propeller blades 250.

With reference to FIG. 2, the first rotor assembly 100 comprises a fluid pathway 110 which serves as part of a lubrication circuit. The fluid pathway 110 extends within the first rotor assembly 100 from a fluid collector 111 to an outlet tube 119 having a fluid pathway outlet 120. The outlet tube 119 is centred on the rotational axis A. The inlet of a pump 114 is connected to the fluid collector 111 by a drain pipe 112. The outlet of the pump 114 is connected to the outlet pipe 119 through first and second surface coolers 116, 117 and a fluid filter 118. The fluid circulating in the fluid pathway 110 is lubricating oil, for lubricating components of the thrust system such as the bearings and the epicyclic gear mechanism 310.

The fluid collector 111 is situated away from the rotational axis A and is an annular radially inwardly opening channel centred on the rotational axis A. The fluid collector 111 is positioned to receive oil that is flowing along a radially outward path 500, shown schematically in FIG. 1, under the action of centrifugal force. The path 500 extends from the interior of the input shaft 302 through both the first and second rotor assemblies 100, 200. Although shown as a line in FIG. 1, the oil may flow over components of the rotor assemblies 100, 200 in the form of a film. By way of example, FIG. 1 shows an annular contra-rotational weir 210 which is part of the second rotor assembly and is formed by a lip on a conical part 220 of the second rotor assembly 200. The oil flows as a film over the part 220 and over the lip 210 to arrive in the fluid collector 111.

A flow restrictor 113 (not shown) may be disposed in the drain pipe 112 between the fluid collector 111 and pump 114. By restricting the flow rate of oil from the collector 111, the flow restrictor causes oil to build up in the fluid collector 111 and the drain pipe 112. Consequently, under many operating conditions, a column of oil is maintained in the drain pipe 111 having a free surface about half way along the length of the drain pipe. The fluid collector 111, the drain pipe 112 and the flow restrictor 113 thus act as a centrifugal de-aerator which enables air bubbles entrained in the oil to escape radially inwardly so that the oil entering the fluid pump 114 is substantially free of entrained air.

The fluid pump 114 is connected to the fluid collector 111 by the drain pipe 112 and is located radially outwardly of the fluid collector 111 within the first rotor assembly 100.

When the rotor assemblies are rotating, the fluid pump 114 is driven and provides sufficient pressure to overcome the centrifugal force such that the oil is pumped toward the rotational axis A, to emerge from the outlet 120 situated within the input shaft 302.

The oil flows through both of the rotor assemblies 100, 200 on the radially outward path 500. The path 500 is described as radially outward in that the radial coordinate is always increasing in a forward direction along the path 500. This does not mean that the path 500 necessarily extends over its full extent along a radial line perpendicular to the rotational axis A. The path may wind and turn in any direction through the first and second rotor assemblies as long as the centrifugal force acting on the oil continues to drive the oil along the path.

The path 500 comprises a series of waterfalls (not shown) similar to the previously described contra-rotating weir 210. The waterfalls are a portion of the path where the oil flows radially outwardly over a lip into free space, arriving at a scoop or other portion of the path 500 at a more radially outward position on the same rotor assembly. A contra-rotating weir differs from a waterfall in that the fluid flows from a position on one rotor assembly to arrive on another, contra-rotating rotor assembly.

The path 500 includes regions in which the oil is conveyed to components to be lubricated, including the planet gears 314, the planet carrier 316, the annulus gear 318 and the bearings that support these components with respect to one another. Substantially all of the oil drains to the conical part 220 and then over the lip 210 into the fluid collector 111. The cycle then repeats.

The waterfalls and weirs have reservoirs to retain the oil when the rotor assemblies 100, 200 are not rotating, and the oil drains under gravity into the reservoirs.

The fluid pump 114 is driven by a drive shaft 140. The drive shaft 140 extends along a radial axis perpendicular to the rotational axis A, and is connected to a bevel gear 142. The bevel gear 142, the drive shaft 140 and the fluid pump 114 are part of the first rotor assembly and are mounted for rotation with the annulus gear 318.

A thrust bearing is provided to resist the centrifugal load on the drive shaft 140.

With reference to FIG. 1, the bevel gear 142 meshes with a larger bevel gear 320 which is connected to the planet carrier 316 and so rotates with the second rotor assembly 200. The planet carrier 316 therefore rotates about the rotational axis A in the opposite direction to the annulus gear 318. Consequently, the bevel gear 142 and the drive shaft 140 are driven to rotate at a rate proportional to the relative speed of rotation of the first and second rotor assemblies 100, 200. The bevel gears 320, 142 provide a gear ratio of 2:1 between the planet carrier 316 and the drive shaft 140. Consequently, the drive shaft 140 is driven to rotate at a rate double that of the relative rotation between the first and second rotor assemblies 100, 200.

With reference to FIG. 2, the fluid pump 114 drives heated oil scavenged by the fluid collector 111 along the fluid pathway 110 through the first surface cooler 116, the fluid filter 118, the second surface cooler 117 and toward the rotational axis A to the gearbox and bearings.

At least some of the components of the fluid pathway 110 are distributed about the rotational axis A to balance the first rotor assembly during rotation. The fluid pump 114 is located substantially diametrically opposite the fluid filter 118. The two surface coolers 116, 117 are located substantially diametrically opposite one another.

The surface coolers 116, 117 transfer heat from the oil to the external air. The surface coolers are on the external surface 130 of the rotor assembly 100. The rate of heat transfer is dependent on the temperature difference between the oil and the external air and the speed of the air over the surface coolers 116, 117. Since the entire rotor assembly 100 is rotating, the speed of the air over the surface coolers 116, 117 is sufficient for a reasonable rate of heat transfer even when the aircraft is stationary on the ground and the propeller blades 150, 250 are feathered.

When the aircraft is in motion, a significant additional axial component to the air velocity over the surface coolers 116, 117 is provided which further enhances the rate of heat transfer.

A typical rotational speed of rotor assemblies 100, 200 in the ground idle condition is 800 rpm. The rotor speed during takeoff is typically 850 rpm. Consequently, the relative speeds of the rotor assemblies 100, 200 is 1700 rpm, and the speed of the pump is 3400 rpm. This is an appropriate speed for a typical oil pump, and is sufficient to generate a pressure in excess of 100 psi. Such a pressure is adequate to drive the oil inwardly to the outlet tube 119 against centrifugal force exerted at a typical radius of 0.4 m during rotation at a speed of 850 rpm.

Providing a fluid pathway 110 including a pump 114 in the first rotor assembly 100 results in an arrangement that allows the oil to be scavenged and returned in a cycle residing entirely within the rotating part of the engine. This eliminates the need for long lengths of pipework that must cross the engine annulus in the static part of the engine.

Furthermore, the rotating fluid pathway 110 allows oil to reach the gearbox and bearings directly, providing a significantly simpler and more efficient means of lubrication than prior art systems that rely on jets or sprays mounted on the static structure.

Further still, the rotation of the surface cooler 116, 117 within the fluid pathway 110 enables a reasonably high air velocity over the surface cooler 116, 117, and consequently a reasonable heat transfer rate from the rotating platform 100, 200 to the atmosphere, even when the aircraft is stationary. This eliminates the need to use alternative means to cool the oil when the aircraft is stationary, which generally require additional components and fuel to operate.

The invention claimed is:

1. A gas turbine engine oil scavenge mechanism comprising a first rotor assembly rotatable about a rotational axis, the first rotor assembly having: a fluid pathway, and a pump for driving oil along the fluid pathway, wherein the fluid pathway and the pump are separate elements, the fluid pathway and the pump are in fluid communication, the fluid pathway and the pump are provided in the first rotor assembly and together form a cycle that allows the driving oil to be scavenged and returned, and the cycle resides entirely within the first rotor assembly and the cycle rotates entirely about the rotational axis with the first rotor assembly.

2. A gas turbine engine oil scavenge mechanism according to claim 1 in which the fluid pathway comprises a fluid collector, and in which the pump has an inlet communicating with the fluid collector, the fluid collector being situated away from the rotational axis of the first rotor assembly.

3. A gas turbine engine oil scavenge mechanism according to claim 2 in which the fluid collector is an annular radially inwardly opening channel centred on the rotational axis.

4. A gas turbine engine oil scavenge mechanism according to claim 2 in which there is a flow restrictor between the fluid collector and the pump.

5. A gas turbine engine oil scavenge mechanism according to claim 2 in which the pump has an outlet which communicates via a portion of the fluid pathway to a region of the mechanism situated radially inwardly of the collector.

6. A gas turbine engine oil scavenge mechanism according to claim 1 in which the fluid pathway comprises at least one surface cooler which is exposed at an external surface of the first rotor assembly.

7. A gas turbine engine oil scavenge mechanism according to claim 6 in which the at least one surface cooler is one of at least two surface coolers which are distributed about the rotational axis, the pump being disposed circumferentially between the surface coolers or between two adjacent surface coolers.

8. A gas turbine engine oil scavenge mechanism according to claim 1 wherein components of the fluid pathway are distributed about the rotational axis of the first rotor assembly to balance the first rotor assembly during rotation.

9. A gas turbine engine oil scavenge mechanism according to claim 1 further comprising a drive shaft mounted in the first rotor assembly for driving the pump, the drive shaft extending radially with respect to the rotational axis of the first rotor assembly.

10. A gas turbine engine oil scavenge mechanism according to claim 1, further comprising a second rotor assembly, which is rotatable about the rotational axis.

11. A gas turbine engine oil scavenge mechanism according to claim 10 in which a drive shaft is driven by relative rotation between the first rotor assembly and the second rotor assembly.

12. A gas turbine engine oil scavenge mechanism as claimed in claim 10, in which the first and second rotor assemblies are drivable by an epicyclic gear mechanism in which the first rotor assembly is mounted for rotation with an annulus gear of the epicyclic gear mechanism and the second rotor assembly is mounted for rotation in the opposite direction with a planet carrier of the epicyclic gear mechanism.

13. A gas turbine engine oil scavenge mechanism according to claim 12, in which a drive shaft for driving the pump is drivingly connected to the planet carrier by a bevel gear arrangement.

14. A gas turbine engine oil scavenge mechanism according to claim 10 wherein the mechanism further comprises at least one weir mounted on either the first or second rotor assembly, the weir being arranged such that, when the rotor assemblies are rotating, the oil flows radially outwardly over the weir between the rotor assemblies.

15. A gas turbine engine comprising a propeller and an oil scavenge mechanism according to claim 1.

* * * * *